3,652,473
MODIFIED POLYOLEFIN COMPOSITIONS
Thomas M. Quinn, West Chester, Pa., and James G. Villanueva, New Castle, Del., assignors to Standard Oil Company, Chicago, Ill.
No Drawing. Filed Mar. 12, 1970, Ser. No. 19,101
Int. Cl. C08f 29/02, 37/00; C09k 3/16
U.S. Cl. 260—23
12 Claims

ABSTRACT OF THE DISCLOSURE

Modified polyolefin compositions capable of being fabricated into articles having reduced coefficients of friction, anti-static properties and resistance to "dusting" are provided from a composition comprising a film-forming polyolefin and from about 0.1% to about 4% by weight of (a) the reaction product of a glycerol monostearate-propylene glycol, (b) a phosphoglyceride and (c) a fatty acid ester of a polyglycerol. The modified polyolefin compositions are useful in preparing self-supporting thin gauge films capable of being used in high speed packaging equipment.

BACKGROUND OF THE INVENTION

A major industrial application of polyolefins such as propylene polymers is in the production of thin gauge films for the packaging industry. One of the undesirable characteristics of films prepared from unmodified polyolefins is that their film-to-film coefficient of friction interferes with their use in automatic high speed packaging equipment by making it difficult to feed single sheets into such equipment. Another disadvantage of such films is their tendency to block which is defined as the tendency of two or more filmed surfaces to adhere to each other while under pressure, that is, to resist separation by a separating force applied perpendicular to the film as by a simple lifting action. This blocking phenomenon also manifests itself in packaging operations wherein a roll of film is used by making it difficult, if not impossible, to remove the film from the roll. A third problem area is the propensity of polyolefin film to accumulate electrostatic charges on the film surface. A fourth problem for users of polyolefin films is "dusting" wherein a layer of dust collects on the surface of the film. Dust may be caused by migration of additives to the surface of the film or by the accumulation of atmospheric dust due to poor anti-static properties of the film. Therefore, it is resirable to incorporate into film-forming polyolefins at least one or more additives which effectively reduce the aforementioned problems without deleteriously affecting the physical properties of the film.

SUMMARY OF THE INVENTION

It is an object of this invention to provide film-forming polyolefin compositions having substantial freedom from blocking tendencies as well as reduced coefficients of friction. It is a further object of this invention to provide film-forming polyolefin compositions that inhibit the accumulation of static electricity and which will impart anti-static properties to self-supporting films prepared from these compositions. It is a further object of this invention to provide propylene polymer films that are resistant to "dusting" resulting from rapid migration of one or more additives to the surface of a film. A still further object of this invention is to prepare a polyolefin film having a favorable balance of the aforementioned properties as well as haze and gloss values that do not significantly vary with time.

These and other objects of the invention may be accomplished by incorporating into a film-forming polyolefin from about 0.1% to about 4% by weight, and preferably from about 0.3% to about 1.5%, based on the weight of said polyolefin of an additive such as (a) the reaction product of glycerol monostearate and propylene glycol, (b) a phosphoglyceride and (c) a fatty acid ester of a polyglycerol. The polyolefin composition may be fabricated into shaped articles such as thin gauge films by convention procedures.

DESCRIPTION OF THE INVENTION

Polyolefins modified according to this invention include solid, substantially crystalline film-forming polymers which contain a major proportion (i.e., greater than 50% and generally greater than 75%) of an aliphatic olefin, having from 2 to 8 carbon atoms. Such polyolefins, therefore, include polyethylene, substantially crystalline film-forming polypropylene, propylene-ethylene block or random copolymers, ethylene-butene-1 block or random copolymers, polybutene-1, poly(4-methylpentene-1) poly(3-methyl-butene-1), and the like. The term polyolefin as used herein is, furthermore, intended to include copolymers of hydrocarbon monomers with copolymerizable polar monomers in which such functional monomers constitute a minor proportion of the copolymer. Preferred polyolefins are polypropylene and propylene-ethylene copolymers such as propylene-ethylene terminal block and multisegment copolymers. Propylene-ethylene multisegment copolymers are described in U.S. Pats. 3,296,338 and 3,442,978. The term "film-forming" is intended to include polymers capable of being fabricated into self-supporting or self-sustaining films not requiring a substrate or support. Such films are used in the packaging industry for wrapping articles. Propylene polymers useful in this invention are also substantially crystalline polymers containing at least 25%, and preferably at least 50% crystallinity as determined by density-crystallinity relationships, a type of technique described by J. A. Gailey et al., SPE Technical Papers (ANTEC), vol IX, pages 1 to 4, February 1963.

The polyolefin compositions having such physical properties as, inter alia, reduced coefficients of friction and anti-static properties are obtained by incorporating into the polyolefin, particularly a propylene polymer, from about 0.1% to about 4% by weight, and preferably from about 0.3% to about 1.5% by weight of an additive such as (a) the reaction product of a glycerol monostearate-propylene glycol, (b) a phosphoglyceride or (c) a fatty acid ester of a polyglycerol.

The reaction product of glycerol monostearate and propylene glycol is obtained by heating at reflux temperatures for a period of about 20 minutes or longer a mixture of glycerol monostearate and propylene glycol wherein the weight ratio of these two components may vary from about 1:4 to 4:1 and preferably from about 1:2 to 2:1. The mixture optionally contains from about 1% to 5% by weight of an alkali metal stearate soap such as sodium stearate. Glycerol monostearate can be prepared by known procedures, as for example, by the glycerolysis of such oils and fats to obtain a complex mixture of various glycerides which can be separated by appropriate distillation procedures.

Phosphoglycerides useful in this invention are glycerides (both mono- and di-) partially esterified with various phosphoric acid derivatives. Particularly preferred are the phosphated monoglycerides of a hydrogenated fat such as stearate.

The fatty acid esters of a polyglycerol useful in this invention are esters of higher fatty acids having from about 14 to 18 carbon atoms such as stearic acid. Esters of polyglycerols from diglycerol to decaglycerol are useful additives and polyglycerol stearate is particularly preferred.

The polyolefin compositions of this invention may additionally contain small amounts of ohter conventional and desirable additives such as anti-oxidants, light stabilizers, dyes, pigments, fillers and the like provided the ingredients do not deleteriously effect the physical properties of films prepared from the compositions.

The compositions of the invention may be prepared by any method suitable for accomplishing an essentially uniform mixture of the polyolefin and the additives. For example, the additives may be incorporated into preformed polypropylene pellets by melt blending in a conventional apparatus such as a Banbury mixer or a concentrate of the additives in the polyolefin may also be made into pellets and this concentrate may also be back blended with additive-free polypropylene pellets and the mixture of pellets may be fed directly to the extruder or may be homogenized in a Banbury.

The modified polyolefin compositions of this invention can be extruded into self-supporting thin films useful in packaging various articles of commerce. Further, these films may be satisfactorily printed by conventional procedures and such films can also be heat sealed.

Films prepared from the polyolefin compositions of this invention were evaluated for physical properties such as haze, gloss, coefficient of friction and surface resistivity by known test procedures. These physical properties will depend in part on extrusion conditions such as die size, extrusion rate, extrusion temperature, quenching temperature, etc. Physical properties of the films were evaluated according to the following procedures: (1) Haze: ASTM procedure D–1003–61, (2) Gloss: ASTM D–2457–65T, (3) Coefficient of friction: moving sled-stationary film method as described in ASTM D–1894–63, Procedure B. The test sled for this procedure is a rectangular metal block, 4 inches by 2.5 inches having a total weight of about 500 grams and the rate of pull on the Instron tester was 10 inches per minute. This procedure is further amplified in U.S. Patent 3,399, 156. (4) Surface resistivity: ASTM D–257–66. Resistivity was measured at 58% relative humidity at a temperature of 75° F. using a ½ inch wide strip of film gripped between electrodes spaced one inch apart with a charge of 1000 volts across the sample. Current flow was measured with an electrometer.

For purposes of illustrating the invention, the following examples are provided wherein, unless otherwise indicated, all parts and percentages are by weight:

EXAMPLES 1–5

In the following Examples and Control, thin gauge film from a propylene-ethylene multisegment copolymer was prepared containing 0.1% by weight of 2,6-ditertiary butyl 4-methyl phenol as a stabilizer and 0.1% by weight of colloidal silica having an average particles size of 3.3 microns and available commercially under the trademark Syloid 244. Each example contained varying amounts of the reaction product of glycerol monostearate and propylene glycol in a weight ratio of about 0.75:1.0 containing about 1 to 2% of sodium stearate soap. This additive had the following properties: acid number of 12 to 16; saponification number of 158 to 163; capillary melting point of 48 to 50° C. and a maximum iodine number of 2. The propylene copolymer of Example 1 contained 0.30% by weight of the additive and Examples 2, 3, 4 and 5 contained 0.40%, 0.45%, 0.60% and 0.80% respectively, of the additive. Control A did not contain the aforementioned glycerol monostearate-propylene glycol reaction product additive, but instead contained 0.14% by weight of erucylamide. But in all other respects the propylene copolymer films of Examples 1–5 were identical to Control A.

The propylene polymer film for Control A and Examples 1–5 was prepared by casting onto a chill roll. The copolymer films in the Control and in Examples 1–5 were evaluated for various physical properties such as haze, gloss, coefficient of friction (COF) and surface resistivity. Since these characteristics may vary with time, the properties were determined after the manufacture of the film and after subsequent periods of time such as 24 hours, 48 hours, one week, two weeks, four weeks and eight weeks. Results are listed in Table I:

TABLE I

|  | Initial | After 24 hours | After 48 hours | After 1 week | After 2 weeks | After 4 weeks | After 8 weeks |
|---|---|---|---|---|---|---|---|
| Control A: |  |  |  |  |  |  |  |
| Percent haze | 2.4 | 1.8 | 1.8 | 2.0 | 1.8 | 2.2 | 2.4 |
| Percent gloss | 86 | 86 | 86 | 85 | 85 | 84 | 83 |
| COF | 0.86 | 0.56 | 0.40 | 0.21 | 0.13 | 0.14 | 0.13 |
| Resistivity | $10^{17}$ | $10^{17}$ | $10^{17}$ | $10^{17}$ | $10^{17}$ | $10^{17}$ | $10^{17}$ |
| Example 1: |  |  |  |  |  |  |  |
| Percent haze | 1.9 | 1.9 | 1.9 | 1.9 | 2.2 | 1.6 | 1.8 |
| Percent gloss | 87 | 88 | 87 | 87 | 83 | 87 | 87 |
| COF | 0.92 | 0.68 | 0.48 | 0.46 | 0.48 | 0.41 | 0.52 |
| Resistivity |  | $6.3 \times 10^{12}$ |  | $9.1 \times 10^{10}$ |  | $10.0 \times 10^{10}$ | $4.8 \times 10^{11}$ |
| Example 2: |  |  |  |  |  |  |  |
| Percent haze | 1.8 | 3.0 | 2.1 | 1.8 | 2.2 | 1.6 | 1.7 |
| Percent gloss | 85 | 86 | 86 | 85 | 84 | 86 | 88 |
| COF | 0.76 | 0.53 | 0.42 | 0.34 | 0.33 | 0.29 | 0.44 |
| Resistivity |  | $3.5 \times 10^{12}$ |  | $2.3 \times 10^{11}$ |  | $8.3 \times 10^{10}$ | $8.3 \times 10^{10}$ |
| Example 3: |  |  |  |  |  |  |  |
| Percent haze | 2.4 | 2.0 | 2.2 | 1.8 | 2.2 | 2.2 | 1.9 |
| Percent gloss | 87 | 87 | 86 | 87 | 87 | 86 | 89 |
| COF | 0.74 | 0.47 | 0.32 | 0.27 | 0.24 | 0.21 | 0.22 |
| Resistivity |  | $5.0 \times 10^{11}$ |  | $5.9 \times 10^{10}$ |  | $5.6 \times 10^{10}$ | $6.7 \times 10^{10}$ |
| Example 4: |  |  |  |  |  |  |  |
| Percent haze |  | 1.8 | 1.4 | 1.6 | 1.7 | 1.9 |  |
| Percent gloss |  | 88 | 88 | 88 | 88 | 87 |  |
| COF |  | 0.26 | 0.24 | 0.18 | 0.21 | 0.17 |  |
| Resistivity |  | $4.6 \times 10^{11}$ |  | $8.3 \times 10^{10}$ | $1.3 \times 10^{11}$ | $8.3 \times 10^{10}$ |  |
| Example 5: |  |  |  |  |  |  |  |
| Percent haze |  | 1.9 | 1.5 | 1.6 | 1.8 | 2.0 |  |
| Percent gloss |  | 88 | 88 | 88 | 87 | 87 |  |
| COF |  | 0.24 | 0.22 | 0.15 | 0.20 | .017 |  |
| Resistivity |  | $1.0 \times 10^{11}$ |  | $1.3 \times 10^{10}$ | $1.8 \times 10^{11}$ | $1.6 \times 10^{11}$ |  |

From the results shown in Table I, it can readily be seen that the propylene copolymer composition containing various amounts of the glycerol monostearate-propylene glycol reaction product substantially improve the anti-static properties of films while maintaining favorable values for other properties. Furthermore, even after extended periods of storage, gloss measurements either remained constant or improved.

EXAMPLE 6

The procedure of Examples 1 to 5 was repeated with the exception that in Example 6, the additive was a phosphated monoglyceride of a completely hydrogenated fat and containing approximately 90% sodium phosphated monostearate. The additive had the following characteristics:

Ash (percent) _____ 21
Chloroform insol. (percent) _____ 12
Phosphorus (percent) _____ 5.5
pH (3% in aqueous alcohol) _____ 6.7
Iodine number _____ 2

Varying amounts of additive were employed and the particular amount is indicated in Table III. The films were evaluated for anti-static properties after aging for one week. The results are shown in Table II.

EXAMPLE 7

Procedure of Examples 1 to 5 was repeated with the exception that the additive employed was a polyglycerol stearate having a Gardner color of 12, an acid number of 3 and saponification number of 150. This additive was incorporated into the film in the amounts shown on Table II and after the film had aged for one week, it was evaluated for anti-static properties and these results are shown in Table II.

EXAMPLES 8–10

Examples 8, 9 and 10 employed 0.30%, 0.40% and 0.45%, respectively, of the phosphoglyceride additive of Example 6 but in all other aspects the films were identical in composition to Example 6. The films were evaluated for COF at various intervals of time and the results are shown in Table III.

EXAMPLES 11–13

Examples 11, 12 and 13 employed 0.30%, 0.40% and 0.45%, respectively, of the polyglycerol stearate of Example 7 but in all other aspects the films were identical in composition to Example 7. The films were evaluated for COF at various intervals of time and the results are shown in Table III.

EXAMPLE 14

Example 1 was repeated with the exception that the film was prepared from polypropylene homopolymer and contained 0.5% of the same glycerol monostearate-propylene glycol additive. Similar physical properties were obtained.

EXAMPLE 15

Example 6 was repeated with the exception that the film was prepared from polypropylene and contained 0.5% of the phosphoglyceride additive. Similar physical properties were obtained.

Polyolefin compositions of this invention are particularly useful in manufacturing film by the chill roll casting technique in which the polymer is extruded at a die temperature of about 500° F. (plus or minus 50° F.). Higher than conventional extrusion temperatures can be used without encountering the usual difficulties associated with the loss of the anti-static and slip agent through volatilization.

TABLE II

| Amount of additive | 0.15% | 0.30% | 0.45% | 0.50% | 0.60% | 0.80% |
|---|---|---|---|---|---|---|
| Example 6 | >$10^{17}$ | >$10^{17}$ | $1.0 \times 10^{11}$ | $2.2 \times 10^{11}$ | $1.3 \times 10^{11}$ | $2.3 \times 10^{11}$ |
| Example 7 | >$10^{17}$ | $1.5 \times 10^{13}$ | $1.5 \times 10^{12}$ | $2.9 \times 10^{13}$ | | |

TABLE III

| | Initial | After 24 hours | After 48 hours | After 1 week | After 2 weeks | After 4 weeks |
|---|---|---|---|---|---|---|
| Example 8 | 0.94 | 0.75 | 0.67 | 0.61 | 0.56 | 0.56 |
| Example 9 | 0.91 | 0.68 | 0.56 | 0.52 | 0.48 | 0.42 |
| Example 10 | 0.83 | 0.57 | 0.43 | 0.33 | 0.36 | 0.30 |
| Example 11 | 0.92 | 0.66 | 0.72 | 0.56 | 0.41 | 0.42 |
| Example 12 | 0.88 | 0.70 | 0.62 | 0.43 | 0.40 | 0.32 |
| Example 13 | 0.90 | 0.55 | 0.56 | 0.40 | 0.39 | 0.34 |

We claim:
1. A composition of matter comprising (1) a normally solid film-forming polyolefin derived from an olefin having from 2 to 8 carbon atoms and (2) from about 0.1% to about 4% by weight, based on the weight of said polyolefin, of an additive selected from the group consisting of (a) the reaction product of glycerol monostearate and propylene glycol wherein the weight ratio of the components of said reaction product range from about 1:4 to 4:1, (b) a phosphoglyceride and (c) a polyglycerol stearate wherein the polyglycerol has from 2 to 10 repeating units.
2. A composition according to claim 1 wherein said additive is employed in an amount from about 0.3% to about 1.5% by weight.
3. A composition according to claim 1 wherein said polyolefin is a propylene polymer.
4. A composition according to claim 3 wherein said propylene polymer is selected from the group consisting of polypropylene, propylene-ethylene terminal block copolymers and propylene-ethylene multisegment block copolymers.
5. A composition according to claim 1 wherein said additive is the reaction product of glycerol monostearate and propylene glycol.
6. A composition according to claim 5 wherein said additive additionally contains up to about 5% by weight, based on the weight of said additive, of an alkali metal stearate.
7. A composition according to claim 1 wherein said additive is a phosphoglyceride.
8. A composition according to claim 7 wherein said phosphoglyceride is a phosphated monoglyceride of a hydrogenated fat.
9. A composition according to claim 1 wherein said additive is a polyglycerol stearate.
10. As an article of manufacture, a self-supporting polyolefin film prepared from the composition of claim 1.
11. As an article of manufacture, a self-supporting propylene polymer film prepared from the composition of claim 1.
12. A composition of matter according to claim 1 wherein the weight ratio of said glycerol monostearate and propylene glycol ranges from about 1:2 to 2:1.

References Cited
UNITED STATES PATENTS 3,354,138  11/1967  Burr _____ 260—94.9
3,265,681  8/1966   Friedman _____ 260—94.9 X

OTHER REFERENCES

Kirk-Othmer, Encyclopedia of Chemical Technology, pp. 629–630 (1966).

DONALD E. CZAJA, Primary Examiner

D. J. BARRACK, Assistant Examiner

U.S. Cl. X.R.

260—94.9 GD, 878 B, DIG 15